Oct. 21, 1969     R. R. MATTINGLY     3,473,630

LOCOMOTIVE TRACTION MOTOR SUPPORT BEARING LUBRICATOR

Filed April 7, 1967

Inventor
Ronald R. Mattingly
By Bedell & Burgess
attys.

United States Patent Office 3,473,630
Patented Oct. 21, 1969

3,473,630
LOCOMOTIVE TRACTION MOTOR SUPPORT BEARING LUBRICATOR
Ronald R. Mattingly, Chicago, Ill., assignor to Hennessy Products, Incorporated, Chambersburg, Pa., a corporation of Delaware
Filed Apr. 7, 1967, Ser. No. 629,269
Int. Cl. F16n 7/24, 25/04; F16c 1/24
U.S. Cl. 184—101      5 Claims

ABSTRACT OF THE DISCLOSURE

An axle and bearing lubricator for transmitting oil from a reservoir in a railroad traction motor housing direct to the surface of an axle driven by the motor. The device is mounted on a removable cover plate applicable as a unit to the housing reservoir and is self-adjustable to maintain adequate feeding throughout substantial variation of oil level in the reservoir.

---

The invention relates to motor driven railway vehicles and more particularly to the lubrication of a driving axle support bearing of a motor housing.

Among the objects of the invention are to insure adequate supply of oil to the motor axle and bearing from an oil sump below the level of the axle by a roller feed actuated by its contact with the axle and free of pump mechanism. It is desired that the device be adapted for ready installation in existing motor housings without machine work on the housing or special equipment.

In the accompanying drawings illustrating the invention:

Figure 1:
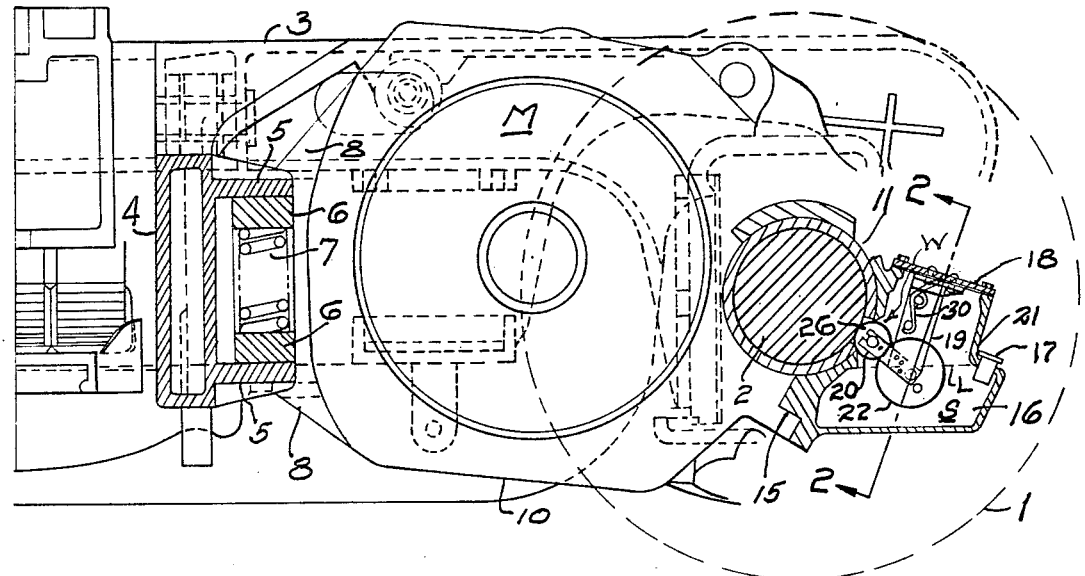
FIG. 1 is a vertical longitudinal section through a portion of a railway truck for motor car or locomotive in which the truck axles and wheels are driven by an electric motor provided with a housing having an oil reservoir and an oil feed device embodying the present invention.
Figure 2:
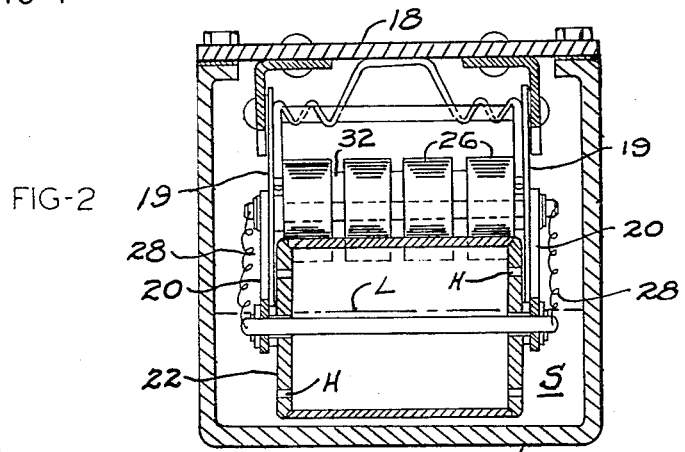
FIG. 2 is a vertical transverse section approximately on line 2—2 of FIG. 1 and is drawn to a larger scale.

The structure shown in FIG. 1 includes truck wheels 1, axles 2, a frame 3 supported from the end portions of the axles and including transverse transoms 4 each having brackets 5 facing the wheels and seating transverse bars 6 thrust apart by coil springs 7 and engaged by projecting lugs 8 on the inner end of a motor main housing 10. The motor enclosed by the housing is indicated at M and is operatively connected to axle 2 by gearing (not shown). The outer end of the motor housing includes a bearing 11 resting upon axle 2. A separable housing member 15 is bolted to main housing 10 and seats a part of bearing 11 and includes a box-like reservoir 16 which forms an oil sump S. The housing outer wall 21 has a filler opening with a plug 17. All the above described parts are well known in trucks of the type referred to.

Reservoir 16 has an open top closed by a removable cover plate 18 bolted to the housing member. The housing member and bearing 11 have windows adjacent to the axle.

Bracket structure carried by the cover plate includes depending legs 19 spaced apart lengthwise of the axle and each has a transverse arm 20. The legs journal a hollow cylinder lubricant pickup element 22 having holes H in its ends to enable the lubricant to seek its level within the cylinder and avoid undue buoyancy of the cylinder in the reservoir. Arms 20 are slotted to slidably receive the axle of a lubricant feed roller element 26. Tension springs 28 thrust roller element 26 toward cylinder element 22. A torsion spring 30 thrusts the bracket structure and elements 22, 26 toward the left and through window W and contact roller 26 with the axle.

Preferably cylinder 22 is of nylon and roller 26 is of high density felt and consists of a plurality of sections with relatively narrow nylon washers 32 between them which afford support for the ends of the sections tending to maintain the diameter of the sections and providing space between them accommodating their swelling because of saturation, heat, or other causes. The contact between the axle and roller 26 rotates the latter and in turn rotates cylinder 22 which projects into the sump below the lubricant level L and feeds lubricant to roller 26, thus lubricating the axle and bearing.

Figure 3:
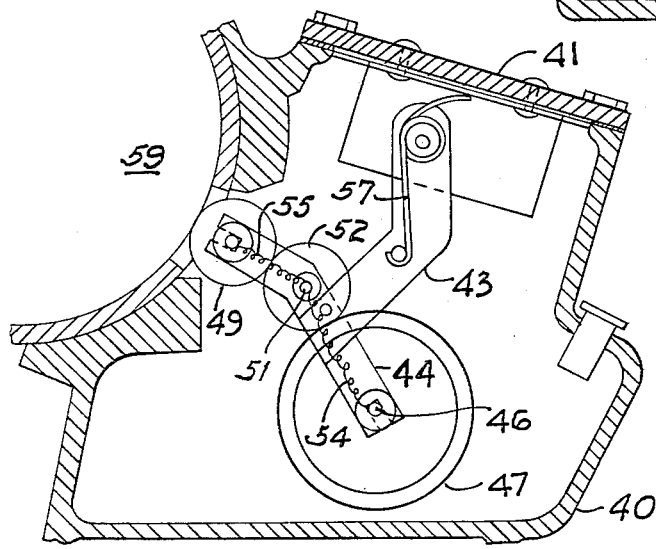
FIG. 3 is a detail section similar to the right hand portion of FIG. 1 but illustrates another form of the invention.

Another form of the invention is shown in FIG. 3 in which the housing reservoir 40, cover plate 41 and depending bracket leg 43 are similar to the corresponding parts previously described, but bracket arm 44 is longer. It is slotted at its lower end to receive axle 46 of a pickup cylinder 47. The upper end of arm 44 is also slotted to slidably receive the axle of feed roller 49. Intermediate the slots in its ends, arm 44 journals an axle 51 of an idler element 52 which engages both elements 47, 49. Tension springs 54, 55 thrust elements 47, 49 toward idler 52. A torsion spring 57 urges the bracket and rotating elements toward axle 59 as in the structure previously described.

The sliding mountings of the shafts for the cylinders and rollers in both forms of the invention, and their springs, compensate for wear on the parts and the bracket springs 30, 57 need not be heavy in order to be adequate for their functions without setting up flat spots on the cylinders and rollers if the truck is idle for an extended period.

What is claimed is:
1. A lubricating device for a locomotive traction motor support bearing on a wheeled axle, comprising a box-like member forming a reservoir for lubricant with a sump in its lower part, there being an opening to the exterior of the upper portion of said member, and a removable cover plate therefor, a feed opening in the side of said member below said cover plate and above the sump, a bracket structure depending from said cover plate, a lubricant feed roller element journaled on said bracket structure and being partly inwardly of the feed opening and extending outwardly thereof to contact an axle journal to be rotated thereby, said feed roller being above the sump, a pickup cylinder element journaled on said bracket structure and projecting into said sump, and supplying lubricant from said sump to said feed roller element, said cover plate, bracket structure and elements being applicable to and removable from said reservoir as a unit through said first-mentioned opening.

2. A lubricating device as described in claim 1 in which the feed roller element and the pickup cylinder element parallel each other, there being yielding means thrusting said elements toward the feed opening.

3. A lubricating structure according to claim 1 in which at least one of said elements is slidable on the bracket structure to and from the other element, and a spring thrusting said elements toward each other.

4. A lubricating device as described in claim 1 in which the upper portion of the bracket structure is pivoted to the cover plate and a spring thrusts the lower portion of said bracket structure and the parts carried thereby toward the feed opening.

5. A lubricating device as described in claim 1 in which the bracket structure includes arms extending transversely of its lower end, the journals of the roller and cylinder elements being slidable on said arms to and from each other, yielding means thrusting said elements toward each other, and an idler roller journaled on said bracket structure between said elements and in contact therewith.

References Cited

UNITED STATES PATENTS

| | | | |
|---|---|---|---|
| 324,864 | 8/1885 | McCorkindale | 184—101 |
| 577,658 | 2/1897 | Hofmeyer | 184—23 |

FOREIGN PATENTS

| | | |
|---|---|---|
| 704,289 | 2/1965 | Canada. |
| 290,520 | 5/1928 | Great Britain. |
| 169,104 | 7/1934 | Switzerland. |

HOUSTON S. BELL, JR., Primary Examiner

U.S. Cl. X.R.

308—90, 91